(12) United States Patent
Smyth et al.

(10) Patent No.: US 9,649,995 B2
(45) Date of Patent: May 16, 2017

(54) UTILITIES POD FOR CARAVANS

(75) Inventors: David Smyth, Newtownabbey (GB); Patrick Hurst, Hillsborough (GB); Richard Bell, Crumlin (GB); Richard Bovill, Comber (GB)

(73) Assignee: Munster Simms Engineering Limited, Bangor, County Down (GB)

( * ) Notice: Subject to any disclaimer, the term of this patent is extended or adjusted under 35 U.S.C. 154(b) by 54 days.

(21) Appl. No.: 13/501,332

(22) PCT Filed: Oct. 13, 2010

(86) PCT No.: PCT/EP2010/006248
§ 371 (c)(1),
(2), (4) Date: Oct. 25, 2012

(87) PCT Pub. No.: WO2011/045034
PCT Pub. Date: Apr. 21, 2011

(65) Prior Publication Data
US 2013/0049402 A1    Feb. 28, 2013

(30) Foreign Application Priority Data

Oct. 13, 2009  (GB) .................................. 0917827.8
Aug. 24, 2010  (GB) .................................. 1014082.0

(51) Int. Cl.
*B60R 7/04*    (2006.01)
*B60R 15/00*   (2006.01)

(52) U.S. Cl.
CPC .................................. *B60R 15/00* (2013.01)

(58) Field of Classification Search
CPC ........ A61F 2002/011; A61F 2230/0006; A61F 2/013; A61F 2/95; A61F 2002/9528; A61F 13/0246; B60R 11/0247; B60R 1/12; B60R 2001/1284; B60R 11/0258
USPC ........ 296/37.14; 244/118.1, 118.5, 53 R, 54, 244/58; 89/34, 37.22; 340/438, 148; 701/36

See application file for complete search history.

(56) References Cited

U.S. PATENT DOCUMENTS 4,394,706 A * 7/1983 Crafts ........................... 361/836
4,559,410 A * 12/1985 Hostetter ....................... 174/497
4,758,027 A * 7/1988 Todd ......................... 285/148.23

(Continued)

FOREIGN PATENT DOCUMENTS

DE          4333454       10/1994
DE          19843289       3/2000

(Continued)

OTHER PUBLICATIONS

Search Report, dated Jan. 21, 2011, corresponding to International Application No. PCT/EP2010/006248 (filed Oct. 13, 2010), parent of the present application, 5 pp.

*Primary Examiner* — Kiran B Patel
(74) *Attorney, Agent, or Firm* — Lathrop & Gage LLP

(57) ABSTRACT

A utilities pod (10) for a vehicle, especially a caravan. The pod is removably mounted underneath the cabin structure and contains utilities apparatus such as a water heater, space heater (62), battery and water tank (60). The pod is connected to the cabin of the vehicle by an interface unit having multiple ports (18) by which said respective utility services are provided to the cabin. The interface unit is configured for installation in the floor of said cabin such that the ports are exposed to the interior of the cabin structure.

21 Claims, 10 Drawing Sheets

(56) References Cited

U.S. PATENT DOCUMENTS

| | | | | |
|---|---|---|---|---|
| 4,854,349 | A * | 8/1989 | Foreman | 138/89 |
| 4,966,063 | A * | 10/1990 | Sanderson et al. | 89/37.22 |
| 5,024,138 | A * | 6/1991 | Sanderson et al. | 89/37.22 |
| 5,206,454 | A * | 4/1993 | Sanderson | 89/33.14 |
| 5,245,908 | A * | 9/1993 | Sanderson | 89/34 |
| 5,253,574 | A * | 10/1993 | Sanderson | 89/34 |
| 5,263,397 | A * | 11/1993 | Sanderson | 89/37.22 |
| 5,390,691 | A * | 2/1995 | Sproule | 137/1 |
| 5,417,460 | A * | 5/1995 | Lunder | 285/253 |
| 6,510,608 | B1 * | 1/2003 | Marshall et al. | 29/869 |
| 6,712,619 | B2 * | 3/2004 | Marshall et al. | 439/34 |
| 7,424,925 | B2 * | 9/2008 | Buglione et al. | 180/65.31 |
| 8,531,278 | B2 * | 9/2013 | DeWard et al. | 340/425.5 |
| 2006/0038668 | A1 * | 2/2006 | DeWard et al. | 340/438 |
| 2008/0254377 | A1 * | 10/2008 | Chen et al. | 430/5 |
| 2009/0294195 | A1 * | 12/2009 | Otsuka et al. | 180/65.275 |
| 2010/0126082 | A1 * | 5/2010 | McLuskey | 52/79.7 |
| 2013/0119760 | A1 * | 5/2013 | Amano et al. | 307/10.1 |
| 2013/0220718 | A1 * | 8/2013 | Gotou et al. | 180/65.6 |

FOREIGN PATENT DOCUMENTS

| | | |
|---|---|---|
| DE | 19945066 | 4/2001 |
| GB | 2165934 | 4/1986 |

\* cited by examiner

UTILITIES POD FOR CARAVANS

CROSS-REFERENCE TO RELATED APPLICATIONS

This application is a U.S. National Stage Application filed under 35 U.S.C. §371 of International Application No. PCT/EP2010/006248, filed Oct. 13, 2010, which claims the benefit of Great Britain Application No. 0917827.8, filed Oct. 13, 2009, and Great Britain Application No. 1014082.0, filed Aug. 24, 2010. Both of these applications are hereby incorporated by reference in their entireties.

FIELD OF THE INVENTION

This present invention relates to the provision of utilities in vehicles, especially caravans, camper vans, mobile homes and recreational vehicles (RVs).

BACKGROUND TO THE INVENTION

Caravans are typically provided with utilities apparatus such as a space heater, water heater, water pump, a water storage tank and/or an electric power supply. Usually, such apparatus are provided inside the cabin of the caravan, for example in a cupboard or in a floor compartment. Inside the cabin, space is at a premium. It would be desirable therefore to provide the caravan with utilities apparatus using as little space as possible within the cabin.

SUMMARY OF THE INVENTION

Accordingly, a first aspect of the invention provides a utilities pod for a vehicle, especially a caravan, camper van, mobile home or recreational vehicle (RV), comprising a cabin structure, the pod being mountable underneath the cabin structure and being shaped and dimensioned to contain, in use, one or more utilities apparatus, the pod further including means for connecting the pod to the cabin structure such that the or each utility service provided by said at least one utilities apparatus may be provided to the cabin structure. The pod advantageously contains a plurality of utilities apparatus and said connecting means comprises an interface unit having a plurality of ports by which said respective utilities are provided to the cabin structure.

A second aspect of the invention provides a vehicle, especially a caravan camper van, mobile home or recreational vehicle (RV), having a cabin structure and a pod according to the first aspect of the invention.

Advantageously, the interface unit is installed, in use, in the floor of said cabin structure such that said plurality of ports are exposed to the interior of the cabin structure.

Locating the utilities pod beneath the cabin structure saves space within the cabin structure, while the interface plate provides a convenient servicing point for an engineer.

Preferably, the pod includes a removable lid. Advantageously, the pod includes at least one drawer shaped and dimensioned for receiving at least one of said at least one utilities apparatus.

Typically, the pod includes at least one port by which said services may be delivered by the apparatus contained within the pod and by which services may be received by the apparatus contained within the pod. Preferably, at least one port is located within a recess formed within an external surface of the pod. The recess is advantageously shaped and dimensioned to receive at least one flexible conduit. At least one port is preferably located at or substantially at an end of said recess.

In use, the pod is typically connected to the cabin structure by means of one or more flexible conduits. The or each conduit preferably longer than the distance between the respective port(s) on the pod and the corresponding port(s) on the cabin structure to allow the pod to be removed from its in-use position without having to disconnect at least some of the conduits.

The pod may be mounted, and preferably removably mounted, to the cabin structure and/or chassis of the vehicle. The pod may include at least one exhaust outlet port.

The utilities apparatus contained in-use within the pod may include one or more of the following: a water tank, a liquid pump, a space heater, a water heater, a grey waste tank, one or more batteries, other electrical power supply, an electrical generator, air conditioning equipment and/or electronic control equipment.

Further preferred features are recited in the claims.

From another aspect, the invention provides a utilities pod for a vehicle, especially a caravan, camper van, mobile home or recreational vehicle (RV), comprising a cabin structure, the pod being mountable underneath the cabin structure and being shaped and dimensioned to contain, in use, one or more utilities apparatus, the pod further including means for connecting the pod to the cabin structure such that the or each utility service WO 2011/045034 PCT IEP201 0/006248 provided by said at least one utilities apparatus may be provided to the cabin structure, wherein said pod is removably mountable on said the chassis of the vehicle. Said chassis typically includes mutually spaced-apart longitudinal support members, the pod being removably mountable between said longitudinal support members. Advantageously, the depth of the pod substantially matches, or at least does not to exceed, the depth of the longitudinal support members. Preferably, opposite sides of the pod, when mounted to the chassis, engage with a respect one of the support members. This allows the pod to provide structural support to the chassis.

Embodiments of the invention are particularly suitable for use with vehicles having a cabin mounted on a chassis, especially caravans, camper vans, mobile homes and recreational vehicles (RVs). However, embodiments of the invention may also be used with static structures, e.g. static caravans, where a cabin structure is mounted on a frame, the pod being mounted to the frame instead of the chassis.

The term "conduit" as used herein is intended to embrace hose, pipe, sleeve, electrical cable and any component that is capable of carrying utilities media, such as air, gas, water, electrical signals or electricity supply, to and/or from the utilities apparatus in the pod. The conduits are typically, but not necessarily, flexible.

Further aspects of the invention will become apparent to those ordinarily skilled in the art upon review of the following description of preferred embodiments and with reference to the accompanying drawings.

BRIEF DESCRIPTION OF THE DRAWINGS

Embodiments of the invention are now described by way of example and with reference to the accompanying drawings in which like numerals are used to denote like parts and in which.

DETAILED DESCRIPTION OF THE DRAWINGS

Figure 1:
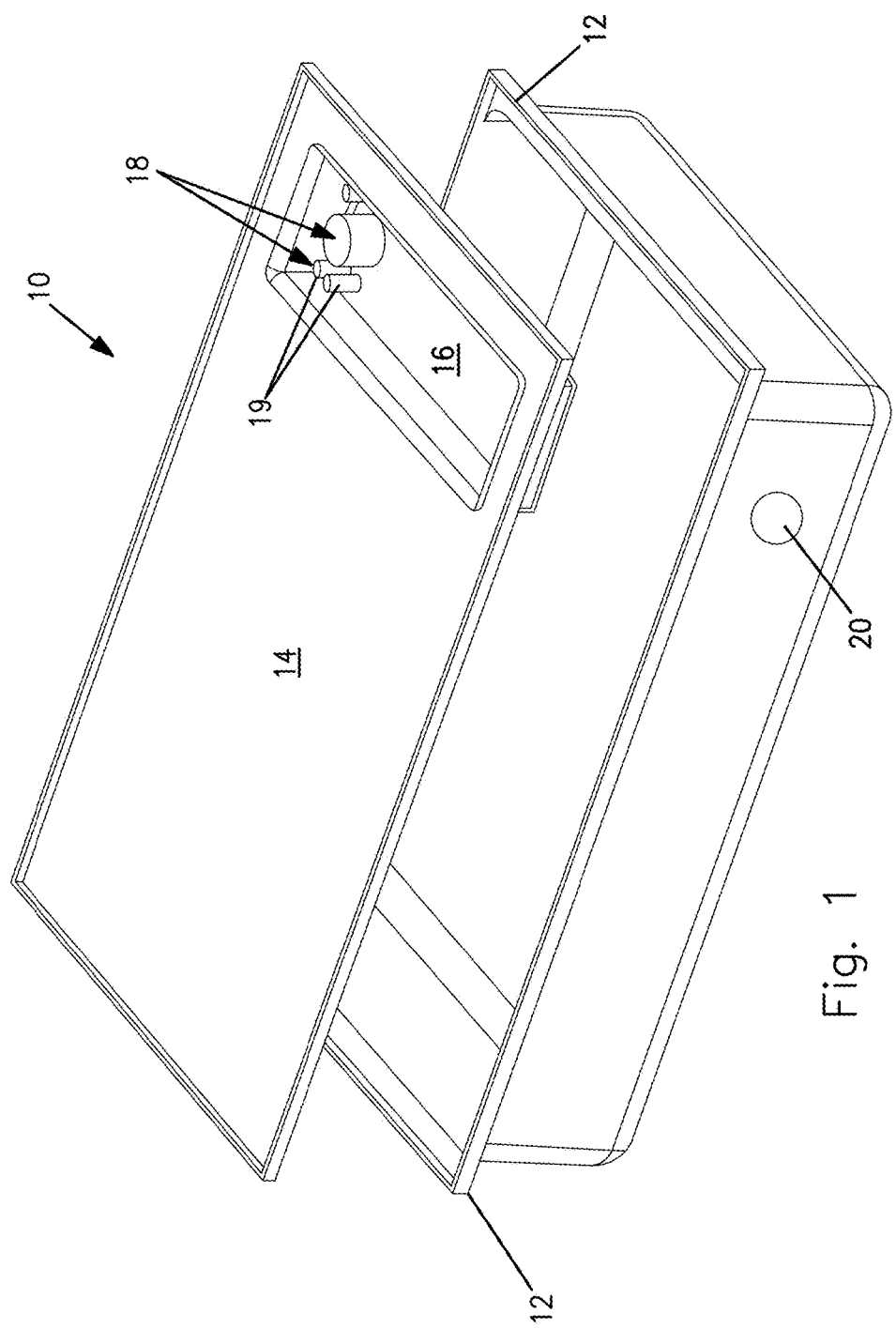
FIG. 1 is an exploded perspective view of a utilities pod embodying the invention.

Referring now to the drawings, there is shown, generally indicated at 10, a utilities pod embodying the invention. In the drawings, the pod 10 is shown as being substantially rectangular in both transverse and longitudinal cross section. It will be understood however that the pod may take any shape suitable to its application. Preferably, the pod includes a respective flange or rail 12 running at least partially along opposite sides of the pod. In the embodiment of FIG. 1, the pod 10 has a removable lid 14.

In preferred embodiments, the pod 10 is shaped to define a recess 16 in its exterior surface. In FIG. 1, the recess 16 is formed in the lid, although in alternative embodiments the recess could be formed in any other suitable surface of the pod 10.

One or more apertures or ports 18 may be provided in the recess, each providing passage between the interior and exterior of the pod 10. Each port 18 may be provided with a male or female connection 19 (male connector shown in FIG. 1) to facilitate the attachment (preferably removable attachment) of a conduit (not shown), such as a hose, pipe, cable or cable conduit. Advantageously, the ports 18 are located at or adjacent one end of the recess 16. The recess 16 is shaped in dimension to receive, in use, one or more lengths of flexible conduit (including for example electrical cable, hose or ducting) that have one end connected to a respective one of the ports 18 and the other end coupled to the cabin of the caravan or other vehicle (not shown in FIG. 1). The pod may also include an exhaust outlet 20.

Figure 2:
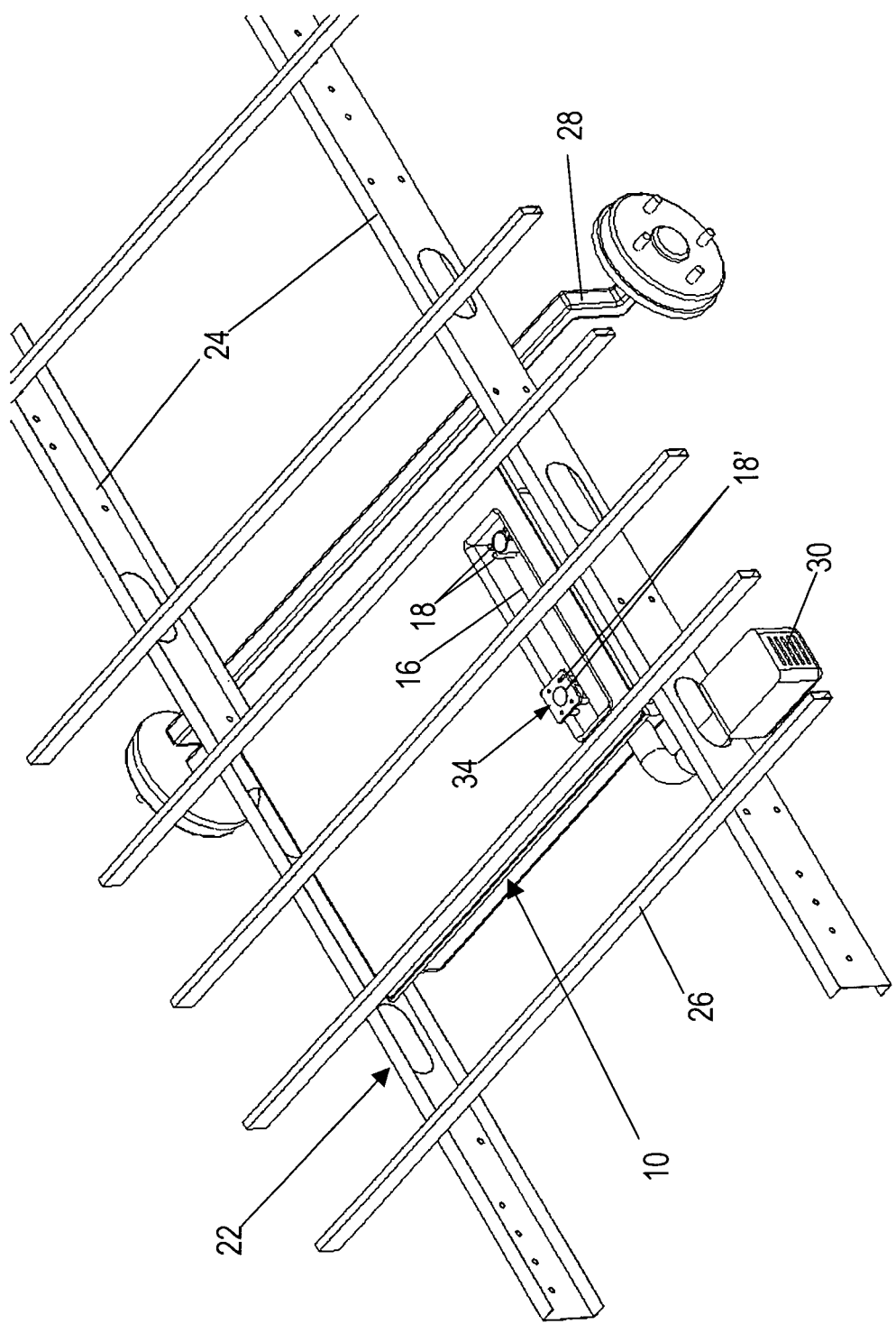
FIG. 2 is a perspective view of the utilities pod of FIG. 1 shown in situ.
Figure 3:
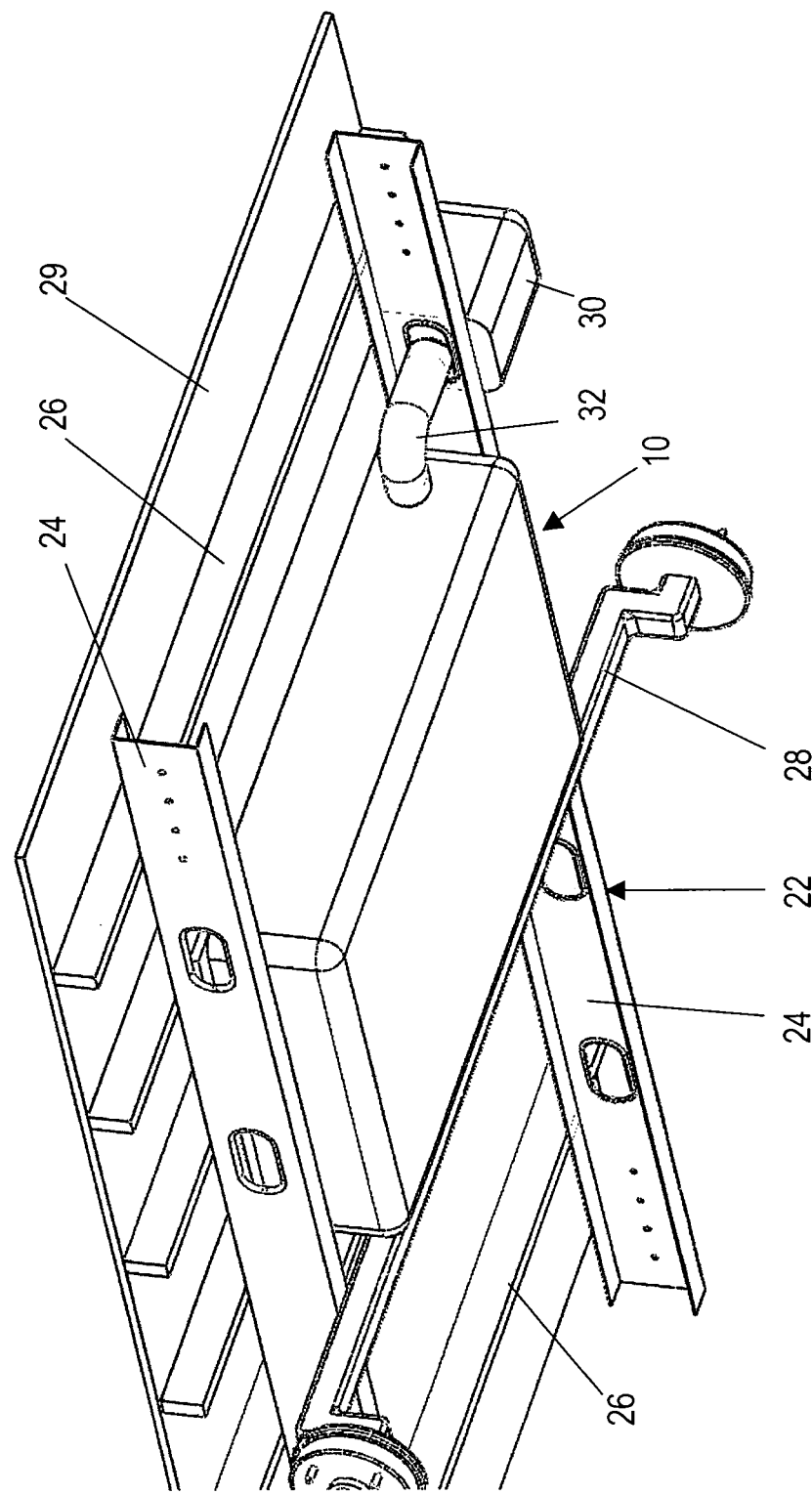
FIG. 3 is an alternative perspective view of the pod of FIG. 1 shown in situ.

FIG. 2 shows the pod 10 mounted on a chassis 22 of a caravan or other vehicle (not shown). The chassis 22, which in this example is assumed to be a caravan chassis, comprises parallel longitudinal support members 24, a plurality spaced apart parallel transverse support members 26 and an axle 28. The cabin (not shown) of the caravan (or other vehicle) is mounted on the transverse support members 26 (FIG. 3 showing a base 29 of the cabin). The pod may alternatively be mounted directly or indirectly to the underside of the cabin structure.

The pod 10 may be mounted to the chassis and/or cabin by any suitable means, preferably between the longitudinal support members 24. By way of example, the depth of the pod may be selected to substantially match, or not to exceed, the depth of the longitudinal support members 24. The size of the pod in the transverse and longitudinal directions may be determined by the apparatus that the pod is intended to contain, but may also be determined by configuration of the chassis 22 and any other component (not shown) that may be mounted on the chassis. Advantageously, opposite sides of the pod 10 engage with a respect one of the support members 24. This allows the pod 10 to provide support to the chassis 22 in the transverse direction. For example, the pod may serve as a transverse support member of the chassis 22.

The pod 10 may be releasably securable to the chassis 22 by any suitable means, typically removable fixings, for example nuts and bolts, brackets, clamps and/or clips. Conveniently, the rails 12 each provide an interface by which the pod 10 may be mounted to a component of the chassis 22 and/or cabin.

As can be seen from FIG. 2, in typical embodiments, the pod is mounted to the chassis and/or cabin such that the recess 16 faces the underside of the cabin.

The exhaust outlet 20 may be connectable to an exhaust outlet device 30 by an exhaust pipe 32. This arrangement is advantageous in cases where exhaust fumes, or flue gases, are required to be vented at or beyond the side of the cabin. Alternatively, exhaust fumes may be vented directly from the exhaust outlet 20.

In use, the pod 10 may contain one or more utilities apparatus including one or more of a space (air) heater, a water heater, a water tank, a water pump (including a fresh water pump and/or a toilet water pump and/or a grey waste pump), a (grey) waste tank, an electrical power supply such as a battery and/or an electrical generator, air conditioning equipment and/or electronic control equipment (not shown). Some of the apparatus, for example the space heater or water heater, may be gas powered, or powered by some other combustible fuel and so will produce exhaust fumes. Means for directing the fumes to the exhaust port 20 (not shown) may be provided as required.

The pod 10 may include one or more additional ports (not shown) for allowing a gas supply or other fuel supply to be provided to the relevant apparatus inside the pod from an external source (not shown). The output of each utilities apparatus is directed out of the pod 10 by a respective port 18. In the case of electrical supply apparatus or electronic control apparatus the output may be carried by one or more electrical cables (not shown), which may be fed through one or more of the ports 18 (although in the case of electronic control apparatus the output may be transmitted wirelessly to a receiver inside the cabin). In the case of pumping or heating apparatus the output may take the form of a fluid (liquid or gas) carried by one or more pipes (not shown). Such pipes may pass through a respective port 18, or the port may form part of the pipe, as is convenient. It is preferred that internal connections are made between the respective apparatus and one or more respective port 18 such that the port forms part of the conduit rather than having pipes or hoses passing through the ports as this facilitates the connection of the pod to the cabin.

Conduits extending from the ports 18 are connected to a corresponding port or aperture (not shown) provided in the cabin to allow the respective outputs of the utilities apparatus to be fed into the cabin. This may be achieved in any suitable manner. Optionally, an interface unit 34 may be provided on the underside of the cabin, the interface unit 34 including a corresponding port 18' for each port 18 of the pod 10. The interface unit 34 typically comprises a plate and is fitted to the cabin such that the respective ports 18' are accessible from inside the cabin.

Preferably the pod 10 is mounted such that the ports 18 are not aligned or with the corresponding apertures/ports 18' formed in the cabin. This increases the length of the conduits that extend between the pod and the cabin. Providing relatively long conduits is advantageous since it facilitates the installation and removal of the pod 10. For example, during installation the pod 10 may be laid on the ground where the conduits are connected between the pod 10 and the cabin, following which the pod may be lifted and mounted to the chassis/cabin. During removal of the pod, the pod may first be disconnected from the chassis/cabin and then laid on the ground before the conduits are disconnected. Ideally therefore the conduit should at least be long enough to allow the pod to rest on the ground while still being connected to the cabin. Advantageously, the conduits (which are typically flexible) are stored in the recess 16 when the pod 10 is mounted on a chassis 22. To this end, it is preferred that the apertures/ports 18' formed in the cabin are aligned or substantially aligned with the opposite end of the recess compared to the ports 18.

Figure 4:
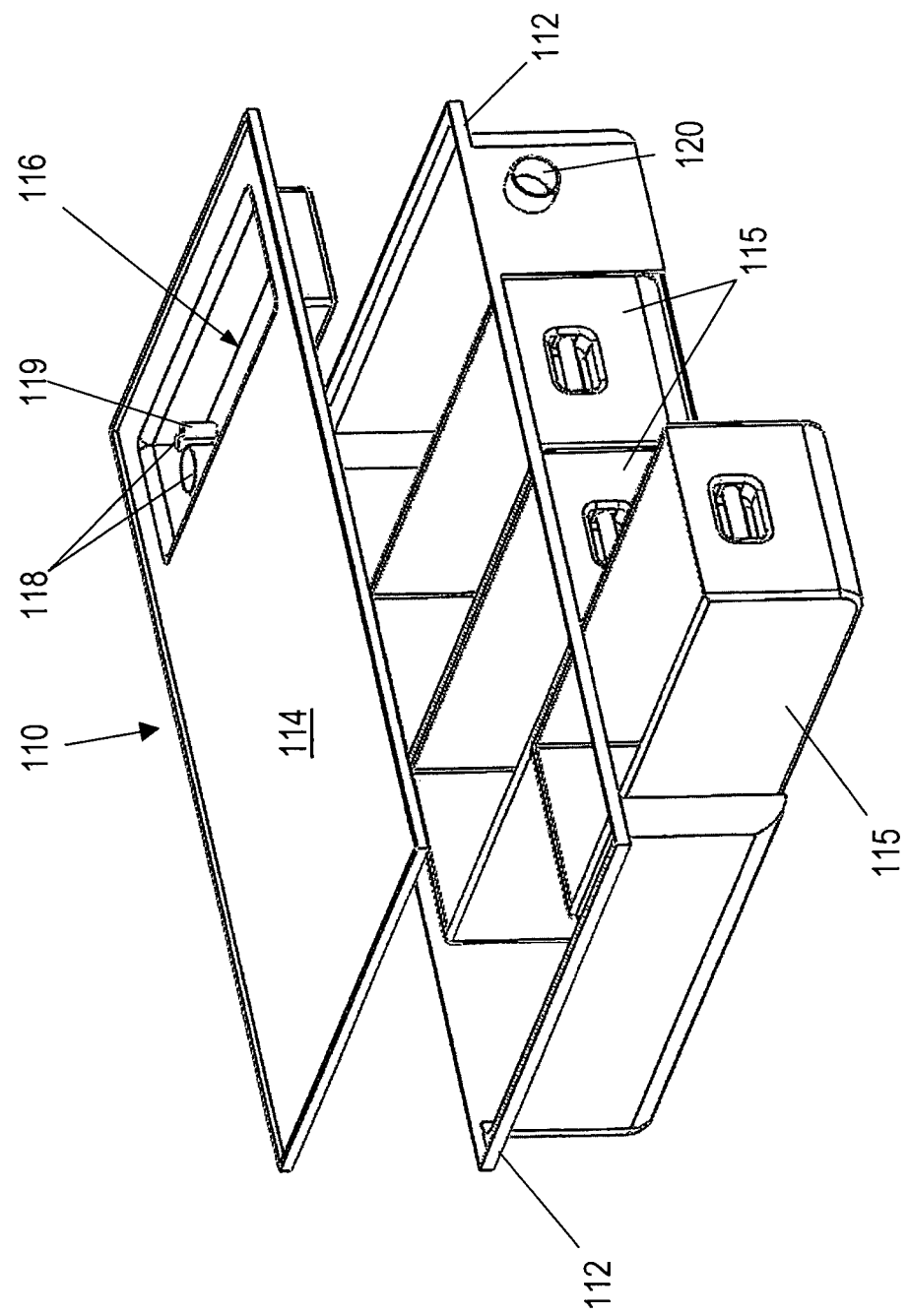
FIG. 4 is an exploded perspective view of an alternative utilities pod embodying the invention.
Figure 5:
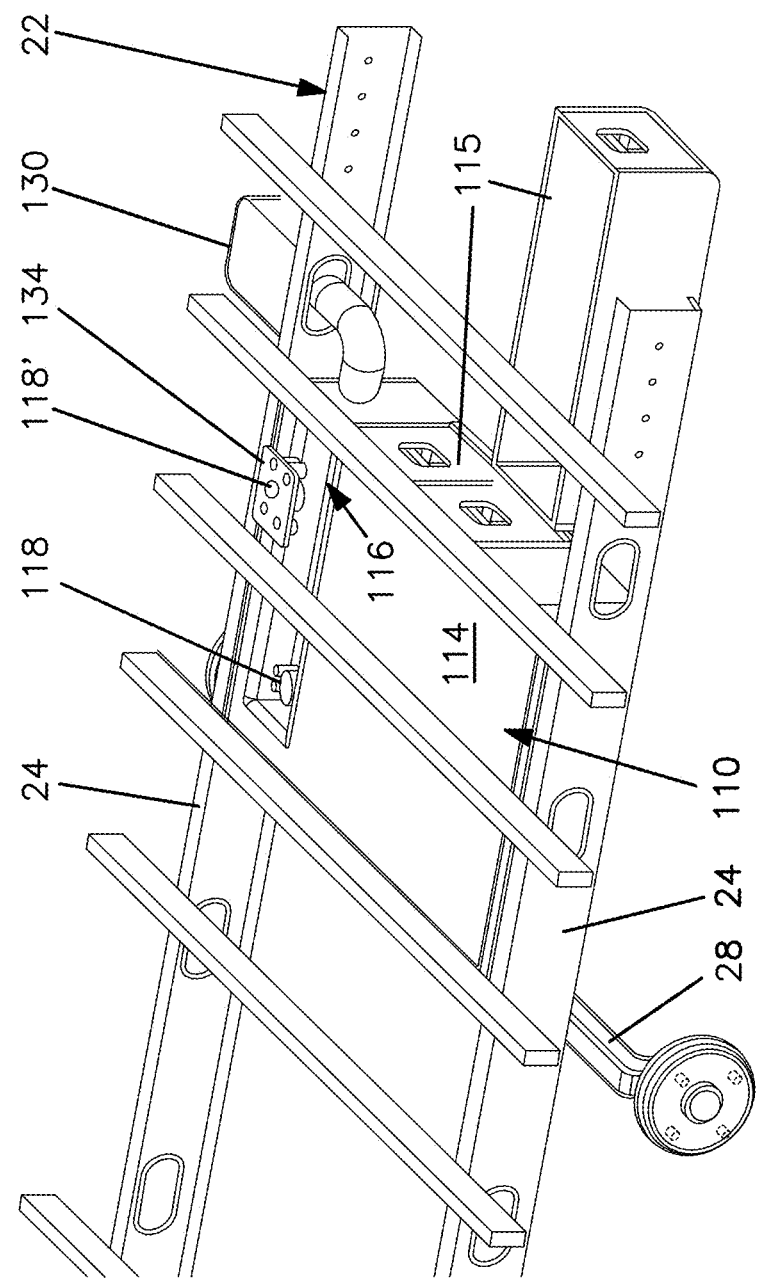
FIG. 5 is a perspective view of the pod of FIG. 4 shown in situ.

Referring now to FIGS. 4 and 5, a second embodiment of a pod is shown generally indicated at 110. The pod 110 is similar to the pod 10 and like numerals used to indicate like parts.

Advantageously, the pod 110 includes a plurality of drawers 115 for containing, in use, at least some of the utilities apparatus to be housed by the pod 110. Optionally, each drawer 115 may be arranged, e.g. shaped and dimensioned, to receive a respective apparatus or set of apparatus for a particular utility. In FIGS. 4 and 5, the three drawers are shown although it will be understood that there could be any number of drawers (one or more) as befits the application. In addition, the respective shapes and sizes of the drawers may vary from application to application. In some cases, the apparatus contained within the drawer may need to be connected to one or more of the ports 118. This may be achieved in any suitable fashion, for example by directing any relevant conduits or connectors over, above and/or through the relevant drawer(s) 115 until the respective port(s) 118 is reached. The drawers 115 allow the respective apparatus to be conveniently installed, removed and/or maintained. For example, as can be seen from FIG. 5, one or more drawers 115 can be removed without having to demount the pod 110 from its normal in-use position and without having to remove the lid 114.

In some embodiments, especially embodiments that have one or more drawers 115, the lid 114 is not necessarily removable.

Figure 6A:
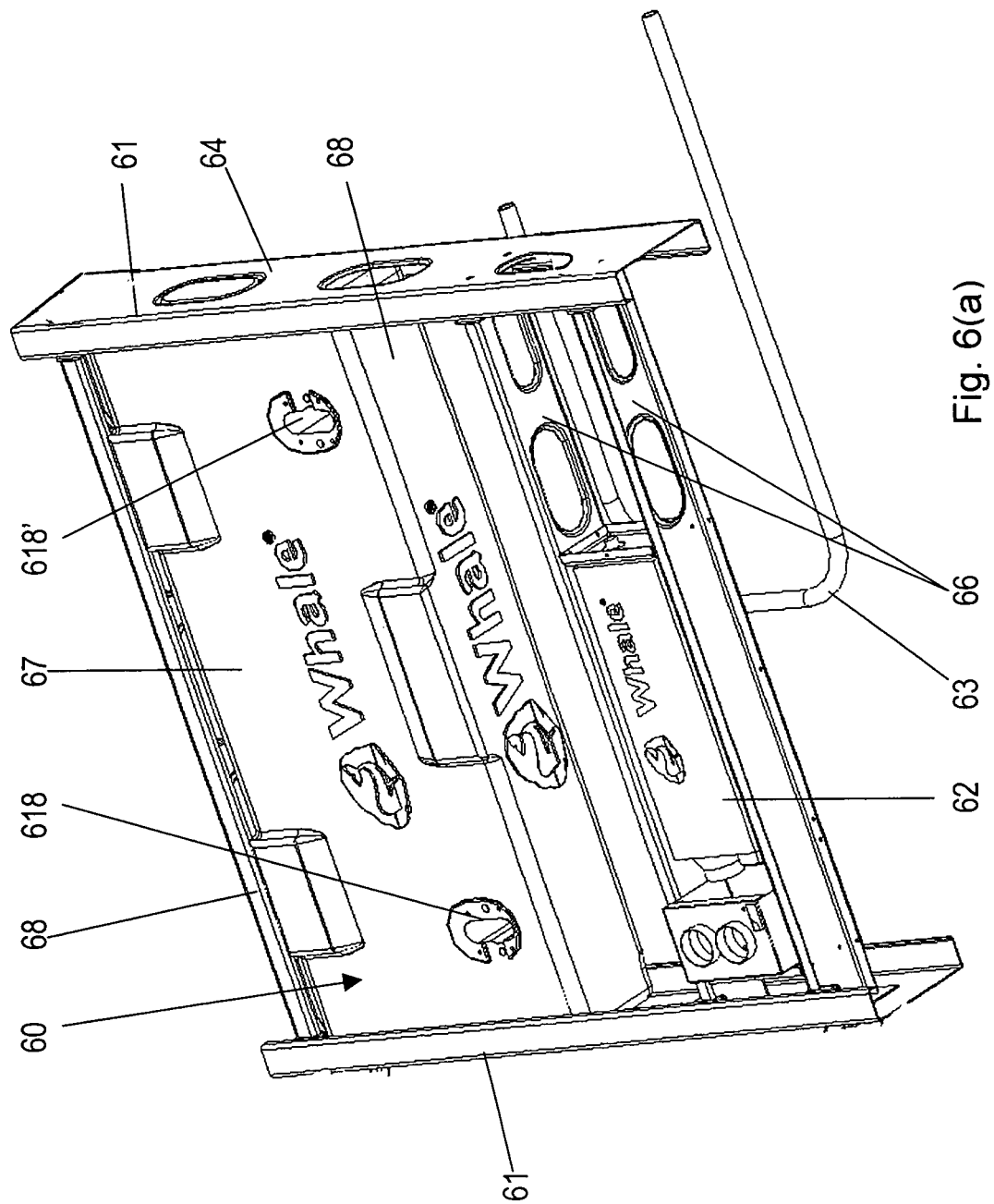
FIGS. 6(a) and 6(b) show respective perspective views of a chassis incorporating two utilities pods according to a third aspect of the present invention.
Figure 6B:
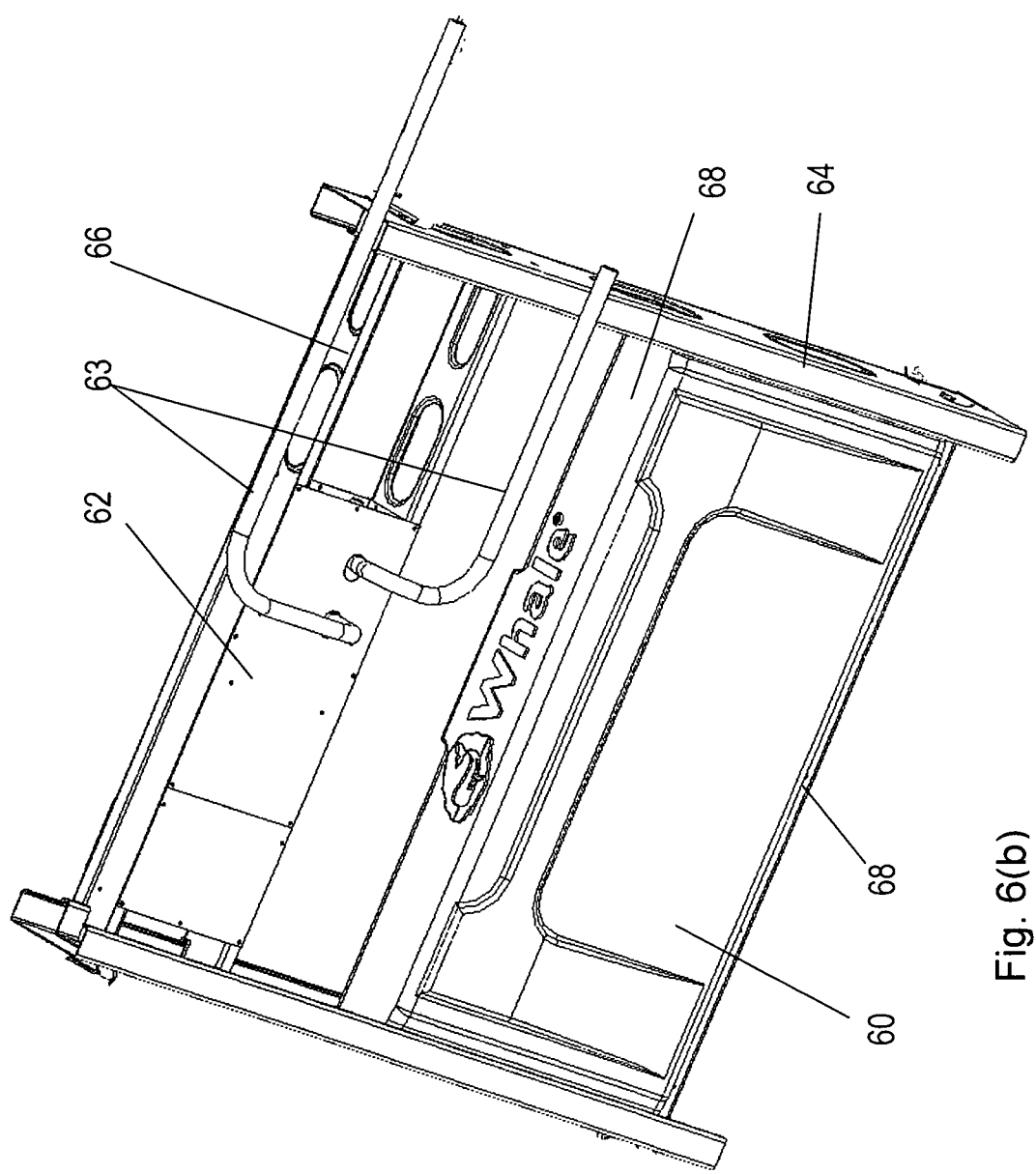

Referring now to FIGS. 6(*a*) and 6(*b*), there is shown two examples of utility pod, namely a water tank 60 and a space heater 62 incorporated within a chassis 64 for a vehicle such as a caravan. The water tank 60 may be, for example, an extended 1201 version of a 401 tank marketed under the Whale trade mark, and may include a water pump, for example a Whale Pump module (typically including a pump, level sensors, drain rod, float switch—not shown). The space heater 62 is, for example, of the type marketed under the Whale trademark, and flue pipes 63 are connected to the space heater and are attached to the chassis. It will be appreciated that this aspect of the invention is not limited to these examples.

The chassis 64 may be of any suitable conventional form, except that cross-members are integrated with each of the utility pods. Thus the space heater 62 is provided within cross-members 66 instead of within the underfloor cover box of the first and second embodiments, whereas the water tank 60 is provided within cross-members 68 again instead of within a cover box. Alternatively, the water tank 60 may be combined with a cross member at one side only. Alternatively still, the water tank my be incorporated into the chassis without the provision of additional cross members, in which case the water tank itself may provide structural support to the chassis in the transverse direction. This aspect of the invention is not limited to this particular example of chassis.

As in the first and second embodiments, incorporating the products within the chassis creates more space within the vehicle. However, by combining the utility pods with the structural supports, weight is also saved by dual-purpose products.

The water tank 60 (and alternatively the pods 10, 110) may be secured to the longitudinal chassis members 61 and/or to one or more transverse chassis members 68 by any conventional means, e.g. bolts or other removable fixings. Threaded sockets (not shown) may be provided in the body of the tank 60 or pod 10, 110 for receiving screws or bolts.

The water tank 60 (and alternatively the pods 10, 110) is preferably substantially rectangular in longitudinal and transverse cross section, or is at least shaped such that it has a substantially planar, and preferably substantially rectangular, upper face 67. The upper face 67 may serve as part of the floor of the vehicle, or to provide support to the floor of the vehicle.

The body of the water tank 60 may include a thermally insulating layer. For example, the body of the water tank 60 may comprise walls having a thermally insulating layer sandwiched between an inner layer and an outer layer. The insulating layer may for example be formed from foamed polyethylene. The inner and outer layers may be formed from plastics, e.g. polyethylene.

The water tank 60 has a port 618 for allowing access to the contents of the tank 60. The port 618 comprises an aperture through which a hose (not shown) or other conduit may be passed to allow water to be pumped into the caravan, or other vehicle, and/or from the vehicle to the tank 60. In some cases, the tank 60 may be used as a fresh water tank in which case the contents of the tank are supplied to the vehicle. In other cases, the tank 60 may be used as a waste water tank in which case waste water may be pumped from the vehicle into the tank.

Alternatively still, the tank 60 may be compartmentalised to serve as both a fresh water and waste water tank in which case both flow and return conduits may be provided, each via the same port 618, or by respective ports 618, 618'.

An interface unit (not shown) may be provided for co-operation with the port 618. The interface unit may include one or more ports for the flow and/or return conduits (as applicable) and is preferably incorporated into the floor of the vehicle. The interface unit may also carry a submersible pump unit (not shown). The pump unit may include a submersible pump, e.g. the aforementioned Whale submersible pump, and any other associated components, e.g. an electric motor, level sensors, drain rod, and/or float switch as applicable. When the interface unit is coupled to the tank 60, the pump unit passes through the port 618 such that the pump is inside the tank 60. As such, the pump can readily be removed from the tank for maintenance.

Figure 7:
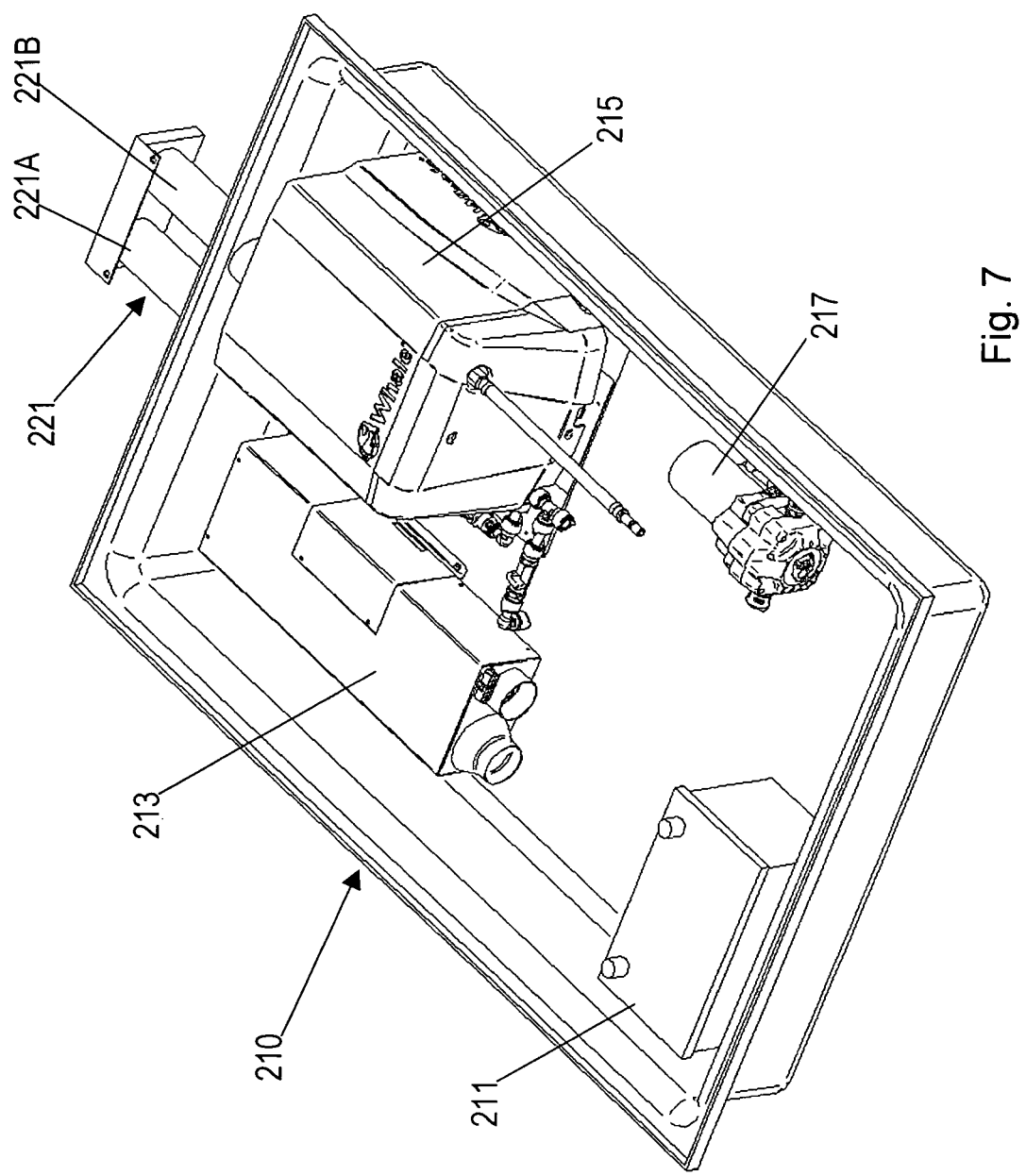
FIG. 7 shows a perspective view of a pod embodying the invention.
Figure 8:
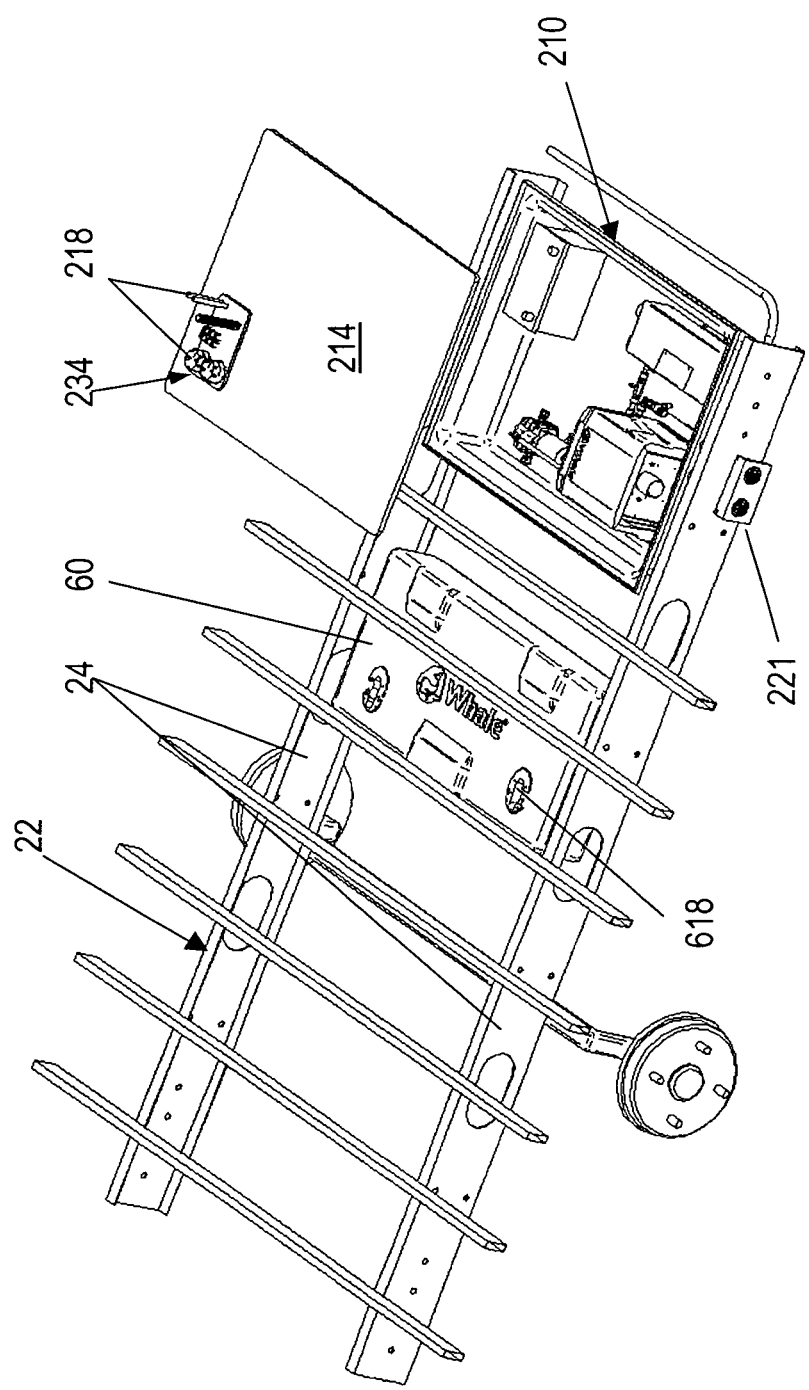
FIG. 8 shows the pod of FIG. 7 incorporated into the chassis of a vehicle with its lid exploded.
Figure 9:
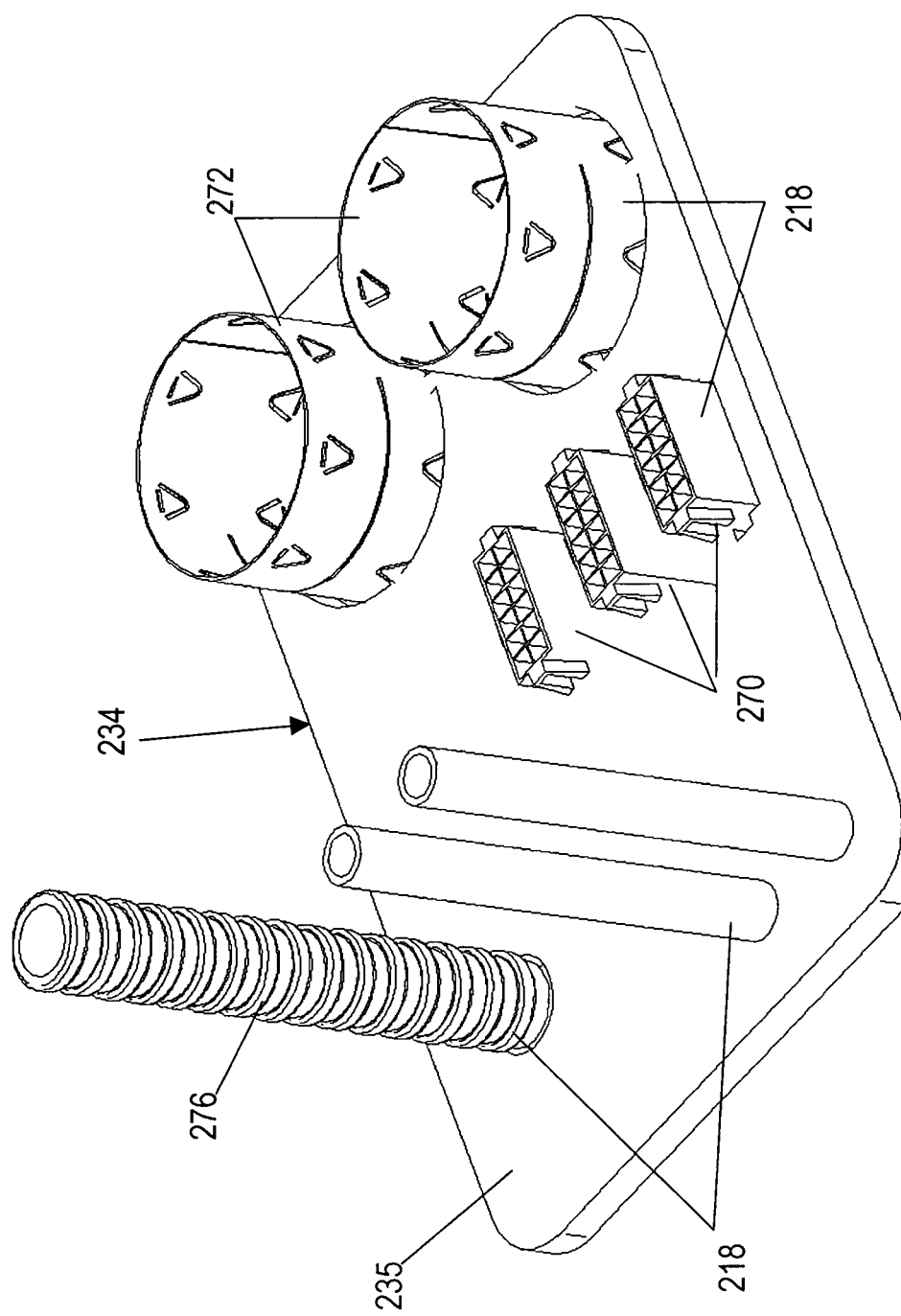
FIG. 9 shows an embodiment of an interface unit for use with pods embodying the invention.

Referring now to FIGS. 7 to 9, there is shown a pod 210 embodying the invention. The pod 210 is similar to the pods 10, 110 and so like numerals have been used to denote like parts and similar descriptions apply as will be apparent to a skilled person. The pod 210 contains a plurality of utilities apparatus, for example a battery 211, a space heater 213, a water heater 215 and an electric pump 217.

The pod 210 may also contain an electronic control module (not shown) for controlling the or each utilities apparatus inside the pod 210 and communicating with one or more remote control units located outside of the pod 210, e.g. a control unit located inside the vehicle/caravan, a control unit located on an external surface of the vehicle and/or or a portable control unit held by a service engineer. Communication between the pod control module and the, or each, other control unit may be wireless or wired as is convenient. In the case of a wireless connection, the respective units have wireless transceivers. In the case of wired connections, these may be made via the interface unit 234 described hereinafter. The pod electronic control module may take any suitable form, typically being processor based having a suitable programmed microprocessor or microcontroller. The pod electronic control module is electrically connected (wirelessly or wired) to each apparatus within the pod that can be controlled and/or monitored electrically. This allows the pod control module to control and/or monitor various parameters of the respective apparatus including operating temperature (e.g. air or water temperature of the air and water heaters), water levels in the water tank(s), water flow rates, valve states. The pod control module and the, or each, other control unit communicate to allow a user inside the caravan/vehicle or a service engineer externally of the caravan/vehicle to monitor and/or set operating conditions of the apparatus within the pod.

The pod 210 includes an external interface comprising at least one port 221 for communication with the external environment, preferably located in a side of the pod 210. In the illustrated embodiment, two ports 221A, 221B are shown, one 221A of which serves as an exhaust outlet for flue gases (from the space heater and/or water heater), the other 221B serving as an inlet for water (for the water heater). Alternatively, or in addition, the ports 221A, 221B (or respective additional ports—not shown) may be used to supply fuel (e.g. gas) or electricity (e.g. from an external battery or a mains supply when the vehicle is stationary) to the pod 210, and/or to take waste water and/or effluent out of the pod 210. The or each port that serves as an outlet from the pod may be provided with a valve, preferably an electrically controllable valve, for controlling the flow of liquid/effluent from the port. It is preferred that the ports 221A, 221B are configured as connectors, e.g. sockets, to allow compatible connectors to be removable connected to them. This enables the pod 210 to be readily disconnected from any external components and so facilitates removal of the pod 210. Alternatively, the ports 221 may comprise conduits or apertures through which other conduits, e.g. hoses pipes or cables, may pass. By way of example, in FIG. 8, the water tank 60 may be connected to the pod 210 via the ports 618, 221B using a suitable conduit, e.g. a. hose (not shown).

The pod 210 has a removable lid 214 for allowing access to the contents of the pod 210. An interface unit 234 is provided for providing communication between the inside of the pod 210 and the inside of the caravan, or other vehicle. The interface unit 234 may be integrally formed with the lid 214, or may be removably mounted on the lid, or may be located elsewhere on the pod 210. The interface unit 234, which conveniently comprises a plate 235, has a plurality of ports 218, one (or more) for each utility apparatus located within the pod 210. The ports 218 allow respective utility related media to be communicated between the pod 210 and the inside of the vehicle, or from one to the other as appropriate. For example, one or more ports 218 may be provided to allow any one or more of cold water, heated water, electricity supply (AC or DC), electrical communication signals, cold air and/or heated air to be supplied from the pod 210 to the inside of the vehicle depending on which utility apparatus are provided in the pod 210. One or more ports 218 may be provided to allow any one or more of waste water, electrical communication signals, cold air and/or heated air to be supplied from the inside of the vehicle to the pod 210 depending on which utility apparatus are provided in the pod 210. For example, in FIG. 9, the interface unit 234 comprises electrical ports 270 for connecting the battery 211 to the inside of the vehicle and for sending electrical control signals to and from the pod 210, e.g. to and from the control module, air ports 272 for delivering hot and cold air to and from the space heater 213 as required, water ports 274 for delivering hot and cold water to and from the pod 210 as required (e.g. to and from the water heater 215) and a waster water port 276 for draining waster water from the vehicle and out of the pod via the ports 221. It will be understood that the number and nature of ports 218 and of types of ports is variable and will depend on the contents and configuration of the pod 210.

It is preferred that the ports 218 comprise a respective connector to which a corresponding component, e.g. a hose, pipe or electrical connector, can be removably connected. This facilitates disconnection of the pod 210 from the vehicle without having to open the pod. Alternatively, the ports 218, or at least some of them, may comprise an aperture or conduit through which another conduit, e.g. hose, pipe, electrical cable, can be passed.

At the reverse face (not visible) of the interface unit 234 (an similarly at the reverse of the ports 18 of the pods 10, 110) there is provided for each port 218 a corresponding conduit, e.g. hose, pipe, electrical cable, extending from the interface unit 234 to the respective component within the pod 210. In the case where the conduit from the vehicle passes through the port 218 it continues to the respective component within the pod 210. In the preferred embodiment, however, where the ports 218 are of the connector type, the conduits running between the interface unit 234 and the components within the pod 210 may be permanently connected to the respective ports 218 of the interface unit but are preferably removably connectable thereto, e.g. by connectors similar to those shown on the obverse face in FIG. 9. In either case, it is preferred that the conduits running between the interface unit 234 and the components within the pod 210 are sufficiently long to allow the lid 214 to be removed to allow access to the inside of the pod 210.

In the embodiment of FIGS. 7 to 9, the pod 210 is, when in use, contiguous with the floor of the vehicle such that the interface unit 234 and in particular the ports 218 are accessible from inside the vehicle. For example an aperture may be formed in the floor for receiving the interface unit 234. Hence, the respective hoses, pipes and cables can be connected and disconnected to the respective ports 218 from inside the vehicle.

Alternatively, a corresponding interface unit (not shown) may be provided in the floor of the vehicle and connected to the interface unit 234 by means of respective suitable conduits. This arrangement is similar to the one described with respect to FIGS. 1 to 5 and allows the pod 210 to be moved from its in use position without disconnecting it from the vehicle.

It will be understood that the interface unit 234 may be used to provide the ports 18 in the embodiments of FIGS. 1 to 5 and/or as the interface unit 34.

As for the pods 10, 110, the pod 210 is incorporated into the chassis 22 of a vehicle, especially a caravan or an RV, and is advantageously located between the longitudinal chassis members 224, being removably secured in place by any convenient means.

It will be apparent from the aforegoing that preferred embodiments of the invention comprise a self-contained pod 10, 110, 210 that allows a number of components or apparatus that are used for the caravan or other vehicle to be located in the pod underneath the main structure, e.g. cabin, of the vehicle and in particular mounted on or incorporated into the chassis. The components/apparatus may include, but are not limited to, a water tank, a pump, space heater, water heater, grey waste tank, battery, power supply or generator, air conditioning unit and/or electronic control system (including more than one of any of the aforesaid). For example, a respective pump may be provided for pumping fresh water into the vehicle, for pumping waste water out of the vehicle and/or for pumping effluent out of a toilet in the vehicle. Waster water may be stored in a waste water (grey waste) tank in the pod or may be directed through and out of the pod via the port(s) 221 (typically under the control of a dump valve). Effluent from the toilet is preferably directed through and out of the pod via the port(s) 221 (typically under the control of a dump valve).

Optionally, the pod 10, 110, 210 may be slidably mounted to the chassis, e.g. by means of slidable rails (not shown) so that the whole pod 10, 110, 210 may slide relative to the chassis between a use position and a servicing position.

It is preferred that the ports 18, 18', 118, 118", 218, 618, 618' comprise connectors to which a respective conduit can be releasably connected. The connectors are provided at least on an obverse face of the respective interface unit or other surface but preferably also on the reverse face of the respective interface unit or other surface. Hence, respective conduits can be releasably connected to at least one but preferably both of opposing faces of the respective interface unit or other surface.

Means for mounting the pod 10, 110, 210 directly to the underside of the body of the vehicle e.g. cabin, may be provided, but alternatively the pod may be mounted directly to the chassis and/or mounted to the underside 29 of the cabin by any suitable means.

Advantageously, means for removably mounting the pod 10, 110, 210 to the chassis and/or cabin/main structure of the vehicle are provided to facilitate installation and maintenance of the apparatus within the pod.

Preferably, the pod 10, 110, 210 is shaped and dimensioned to provide flexibility of installation such that changing the orientation of the pod with respect to the chassis/vehicle allows the pod to be used with vehicles having different configurations and in particular different locations of utilities and utilities inlets. It is particularly preferred that the pod is substantially rectangular in transverse and longitudinal cross section.

The connection between the pod 10, 110, 210 and the caravan for the relative utility(ies) e.g. water, gas, electrical power or any other required service, may be achieved by an interface unit which may support a standard or quick release connection for at least some of the utilities.

Since, in some embodiments, the pod 10, 110, 210 can be removed from its normal in-use position, without disconnecting the pod from the caravan/vehicle (as described above), servicing tasks may be performed on some or all of the apparatus contained within the pod without interrupting the operation of at least some of the apparatus contained within the pod.

One or more of the ports 18, 218 may be used to provide a return path for fluids such as water or air from the caravan/vehicle back to the pod. One or more of the ports (not shown) may be provided to allow services to be provided to the pod 10, 110, 210, for example electrical power, water, air and/or fuel gas or other fuel. For example, a gas-powered space heater may require fuel gas provided to the pod 10, 110, 210 and/or may require a supply of air to be heated. The air supply may be provided from the external atmosphere by any suitable means. Alternatively or in addition, means for providing the air for heating from the inside of the cabin may be provided. Hence, provision may be made for connections to the pod 10, 110, 210 to external services including but not limited to water, fuel gas and fresh air. Connections for exhaust gases and/or fresh air may also be provided as appropriate. The pod 10, 110, 210 may be provided with a control unit capable of communicating, for example wirelessly, with a remote monitoring unit to provide data concerning the operation of the apparatus within the pod.

For example, in cold conditions, it may be preferable to direct relatively warm air from inside the cabin into the pod 10, 110, 210 for heating by a space heating apparatus rather than heating cold air from the external environment.

In some embodiments, the pod 10, 110, 210 may include a heat exchanger arranged to perform a heat exchanging operation between relatively cold air ducted into the pod (e.g. from the external environment and/or from inside the cabin) with relatively warm air produced by one or more apparatus within the pod.

The pod 10, 110, 210 preferably includes means for flueing and/or sealing exhaust gases, preferably internally and/or externally from the caravan or other vehicle cabin.

Advantageously, the arrangement is such that the pod 10, 110, 210 is sealed with respect to the inside of the cabin/vehicle structure such that exhaust gases are unable to pass from the pod to the inside of the cabin/vehicle. The pod may be sealed to prevent ingress of fluid from the external environment (other than as is required for operation of the pod).

The pod 10, 110, 210 mounting means may include means for substantially isolating or otherwise protecting the pod from vibrations incurred during movement of the caravan/vehicle.

Means for thermally insulating the pod 10, 110, 210, and particularly the contents of the pod, may be provided.

It will be understood that the various features of the respective pods 10, 110, 210 may each be used with the other pods 10, 110, 210 as would be apparent to a skilled person.

The invention is not limited to the embodiments described herein, which may be modified or varied without departing from the scope of the invention.

The invention claimed is:

1. A vehicle comprising:
   a chassis;
   a cabin structure mounted on the chassis, the cabin structure including a base;
   a utilities pod removably mounted on the vehicle beneath the base of the cabin structure;
   a plurality of utilities apparatus located inside the utilities pod; and an interface unit having a plurality of ports, the interface unit being installed in the base of the cabin structure such that the plurality of ports of the interface unit is exposed to the interior of the cabin structure, in order to provide a respective utility service to the cabin structure.

2. A vehicle as claimed in claim 1, wherein the utilities pod further comprises at least one drawer shaped and dimensioned for receiving at least one of the plurality of utilities apparatus.

3. The vehicle as claimed in claim 1, wherein the utilities pod has a plurality of ports and the interface unit is connected to the utilities pod by a plurality of flexible conduits, a respective conduit extending between a respective one of the ports on the interface unit and a corresponding one of the ports on the utilities pod.

4. The vehicle as claimed in claim 3, wherein the corresponding ports provided on the utilities pod are located together on said utilities pod.

5. The vehicle as claimed in claim 4, wherein the corresponding ports provided on the utilities pod are located within a recess formed in an exterior surface of the utilities pod.

6. The vehicle as claimed in claim 5, wherein the recess is shaped and dimensioned to receive the flexible conduits when the utilities pod is mounted underneath the cabin structure.

7. The vehicle as claimed in claim 5, wherein the corresponding ports provided on the utilities pod are located substantially at an end of the recess.

8. The vehicle as claimed in claim 3, wherein at least some of the flexible conduits are longer than the distance between the interface unit and the corresponding ports provided on the utilities pod to allow the utilities pod to be removed from said chassis without disconnecting the at least some of the flexible conduits.

9. The vehicle as claimed in claim 1, wherein the interface unit is provided on the utilities pod.

10. The vehicle as claimed in claim 3, wherein at least some of the ports comprise connectors configured to releasably connect with a respective one or more of the flexible conduits.

11. The vehicle as claimed in claim 3, wherein at least some of the ports define apertures through which a respective one or more of the flexible conduits can pass.

12. The vehicle as claimed in claim 3, further comprising a removable lid to allow access to the utilities apparatus.

13. The vehicle as claimed in claim 1, wherein the utilities pod is mounted on the chassis.

14. The vehicle as claimed in claim 1, wherein said chassis includes mutually spaced-apart longitudinal support members, the utilities pod being removably mountable between the longitudinal support members.

15. The vehicle as claimed in claim 14, wherein opposite sides of the utilities pod engage with a respective one of the longitudinal support members when located between the longitudinal support members.

16. The vehicle as claimed in claim 1, wherein the utilities pod is mounted on the underside of the cabin structure.

17. The vehicle as claimed in claim 1, wherein the utilities pod is slidably mounted on the vehicle.

18. The vehicle as claimed in claim 1, wherein the utilities pod includes at least one port for communicating with an external environment.

19. The vehicle as claimed in claim 18, wherein the at least one external environment port includes at least one fluid exhaust port.

20. The vehicle as claimed in claim 18, wherein the at least one external environment port includes at least one fluid inlet port.

21. The vehicle as claimed in claim 1, wherein each of the utilities apparatus comprises any one of a water tank, a liquid pump, a gas pump, a space heater, a water heater, a grey waste tank, a battery, an electrical generator, air conditioning equipment or electronic control equipment.

* * * * *